(12) United States Patent
Roth (10) Patent No.: US 8,855,449 B1
(45) Date of Patent: Oct. 7, 2014

(54) ADIABATIC WAVEGUIDE POLARIZATION CONVERTER

(71) Applicant: Jonathan Edgar Roth, Santa Barbara, CA (US)

(72) Inventor: Jonathan Edgar Roth, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 13/966,194

(22) Filed: Aug. 13, 2013

(51) Int. Cl.
| | |
|---|---|
| *G02B 6/00* | (2006.01) |
| *G02B 6/26* | (2006.01) |
| *G02F 1/295* | (2006.01) |
| *G02B 6/42* | (2006.01) |
| *G02B 6/28* | (2006.01) |
| *G02B 6/27* | (2006.01) |

(52) U.S. Cl.
CPC .................................... *G02B 6/2773* (2013.01)
USPC .............................................. 385/11; 385/15

(58) Field of Classification Search
USPC .............. 385/6, 11, 14, 15, 16, 27–30, 32, 43
See application file for complete search history.

(56) References Cited

U.S. PATENT DOCUMENTS

| | | | | |
|---|---|---|---|---|
| 3,583,641 A | * | 6/1971 | Sterz | 454/123 |
| 4,723,316 A | | 2/1988 | Glance | |
| 5,133,029 A | | 7/1992 | Baran et al. | |
| 5,626,408 A | * | 5/1997 | Heynderickx et al. | 353/20 |
| 5,809,184 A | | 9/1998 | Doerr et al. | |
| 5,946,434 A | * | 8/1999 | Lee | 385/45 |
| 6,384,796 B1 | * | 5/2002 | Reimann et al. | 343/786 |
| 7,373,042 B2 | * | 5/2008 | Little | 385/28 |
| 7,469,084 B2 | | 12/2008 | Aalto | |
| 7,483,641 B1 | * | 1/2009 | Mak | 398/204 |
| 7,499,610 B2 | * | 3/2009 | Little | 385/28 |
| 7,577,325 B2 | * | 8/2009 | Little | 385/28 |
| 7,702,188 B2 | * | 4/2010 | Little et al. | 385/5 |
| 8,189,972 B2 | | 5/2012 | Little | |
| 8,238,697 B2 | * | 8/2012 | Little et al. | 385/5 |
| 2008/0019637 A1 | * | 1/2008 | Little et al. | 385/28 |

OTHER PUBLICATIONS

"B. Glance, Polarization Independent Coherent Optical Receiver, Journal of Lightwave Technology, vol. LT-5, No. 2, Feb. 1987, IEEE", (Feb. 1987), 274-276.

"Cao et al., Adiabatic couplers in Soi waveguides, Rochester Institute of Technology, 77 Lomb Memorial Drive, Rochester, NY, 14623, USA, 2010 Optical Society of America", (2010), pp. 2.

(Continued)

*Primary Examiner* — Akm Enayet Ullah
(74) *Attorney, Agent, or Firm* — Blakely Sokoloff Taylor & Zafman LLP (57) ABSTRACT

Embodiments of the invention enable polarization diversity using a more general component than current polarization splitter and rotator solutions. Devices such as an optical receiver, transmitter or duplexer may utilize polarization diversity to efficiently process incoming signals regardless of the signal's polarization. Embodiments of the invention may be described as enabling polarization diversity via an adiabatic waveguide polarization converter. When utilized in an optical system of discrete components or in a photonic integrated circuit (PIC), this adiabatic waveguide polarization converter may receive an unknown single-mode polarization of light. This light may, for example, originate from a remote location and come through a single mode fiber. As described in further detail herein, embodiments of the invention reduce the requirements and component complexity for polarization handling for polarization diversity systems. By reducing the component complexity, insertion loss is reduced, device footprint is reduced, and device reliability and tolerances may be improved.

16 Claims, 6 Drawing Sheets

(56) References Cited

OTHER PUBLICATIONS

"Ding et al., Polarization Diversity DPSK Demodulator on the Silicon-on-Insulator Platform with Simple Fabrication, OTh4I.4.pdf, OFC/NFOEC Technical Digest 2013 OSA", (2013), pp. 3.

"Ding et al., Wide-band Polarization Splitter and Rotator with Large Fabrication Tolerance and Simple Fabrication Process, OTh4I.2.pdf, OFC/NFOEC Technical Digest 2013 OSA", (2013), pp. 3.

"DX Dai et al., Passive technologies for future large-scale photonic integrated circuits on silicon: polarization handling, light non-reciprocity and loss reduction, Light: Science & Applications (2012) 1, e1; doi:10.1038/Isa.2012.1; published online", (Mar. 29, 2012), pp. 12.

"Wang et al., Ultra-small silicon polarization beam splitter based on cascaded asymmetry directional couplers, OTh4I.1.pdf, OFC/NOFEC Technical Digest 2013 OSA", (2013), pp. 3.

* cited by examiner

ADIABATIC WAVEGUIDE POLARIZATION CONVERTER

FIELD

Embodiments of the invention generally pertain to optical devices and more specifically to adiabatic waveguide polarization converters.

BACKGROUND

Polarization diversity describes splitting an arriving optical signal into two orthogonal polarization components in order to process the two polarization components separately. Current solutions for photonic integrated circuits split light into two segments—fundamental transverse electric and traverse magnetic modes (i.e., TE0 and TM0); one of these segments is then rotated (i.e., either TE0 to TM0 or TM0 to TE0). When both segments are either TE0 or TM0, they are transmitted through identical circuits or through symmetric paths on the same circuit.

Thus, current solutions for polarization diversity typically require the input light to have polarization states of TE0 and TM0 waveguide modes in a PIC, and require devices or optical circuit components to rotate of one of these modes.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention enable polarization diversity using a more general component than current polarization splitter and rotator solutions. Devices such as an optical receiver, transmitter or duplexer may utilize polarization diversity to efficiently process incoming signals regardless of the signal's polarization. Embodiments of the invention may be described as enabling polarization diversity via an adiabatic waveguide polarization converter. When utilized in an optical system of discrete components or in a photonic integrated circuit (PIC), this adiabatic waveguide polarization converter may receive an unknown single-mode polarization of light. This light may, for example, originate from a remote location and come through a single mode fiber.

As described in further detail below, embodiments of the invention reduce the requirements and component complexity for polarization handling for polarization diversity systems from the previously recognized requirement to convert a waveguide TE0 and TM0 modes to identically polarized modes in separate waveguides. By reducing the component complexity for polarization diversity systems, insertion loss is reduced, device footprint is reduced, and device reliability and tolerances may be improved.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
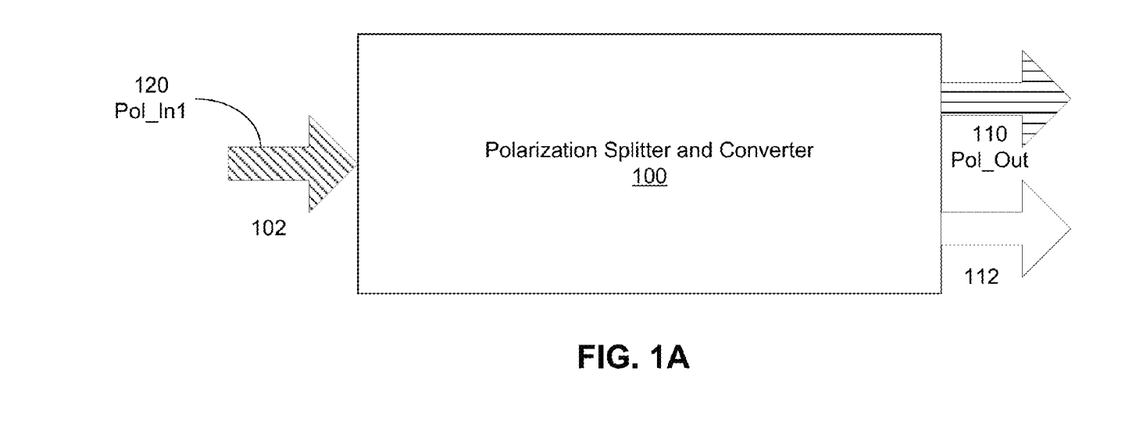
FIG. 1A and FIG. 1B are illustrations of a polarization converter and splitter according to an embodiment of the invention.
Figure 1B:
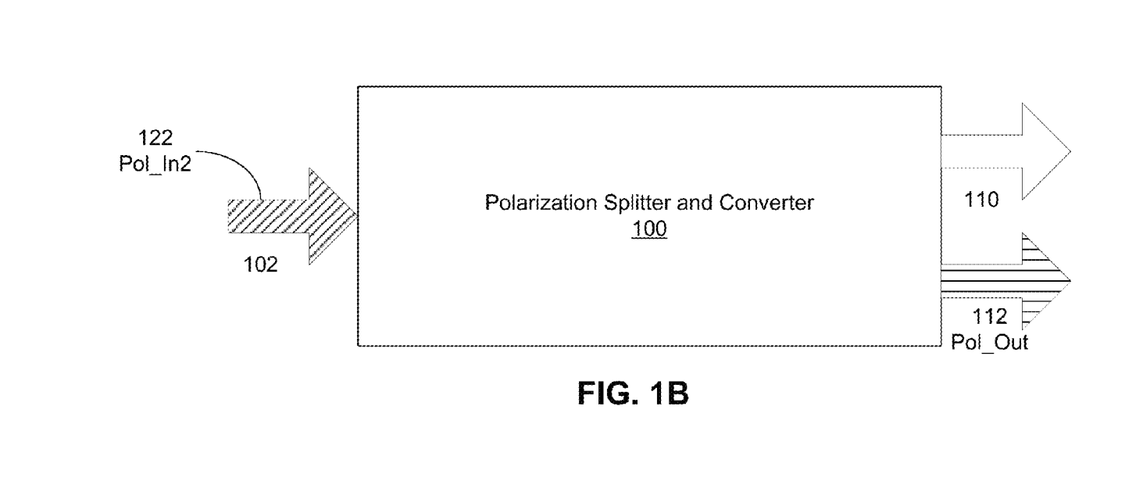

FIG. 1A and FIG. 1B are illustrations of a polarization converter and splitter according to an embodiment of the invention. In this embodiment, light comprising an unknown polarization state is received at input 102 from a single mode fiber (not shown; in other embodiments, input means other than a fiber may be utilized). The received light is converted by polarization converter and splitter 100 into identical modes in a pure polarization state (e.g., TE or TM mode polarization) in two separate waveguides at output 110 and output 112. By using this component, it is possible to process the light in two identical circuits or circuit paths within a PIC or system such that the overall circuit response is independent of the polarization state of the input light (i.e., the overall circuit is polarization insensitive).

One of the differences between this embodiment and previous solutions is that, while two particular input polarization states would result in light exiting only one of the output waveguides at a time, these two input polarization states do not necessarily need to be TE/TM modes, but may also be two polarization states that are orthogonal to one another but are superpositions of TE and TM modes, as described below.

FIG. 1A illustrates light 120 having a first fiber mode polarization state (referred to herein as Pol_In1) is output via output 110, while FIG. 1B illustrates that light 122 having a second fiber mode polarization state (referred to herein as Pol_In2), orthogonal to the first fiber mode polarization state, is output via output 112. Previous solutions would further limit light 120 and 122 to be TE/TM waveguide modes. Embodiments of the invention such as polarization converter and splitter 100 may receive any two arbitrary orthogonal polarization states (i.e., need not be TE0 and TM0). Thus, in embodiments of the invention, a wider range of components may satisfy the polarization requirement for a polarization diversity circuit. Furthermore, the polarization states Pol_In1 and Pol_In2 may vary as a function of wavelength across the device's bandwidth of operation without compromising the utility of the device.

Input polarizations Pol_In1 and Pol_In2 are converted to light having a polarization Pol_Out for outputs 110 and 112, respectively. Pol_In2 is necessarily orthogonal to Pol_In1, but both are converted to modes of the same polarization state Pol_Out. If Pol_In1 and Pol_In2 do not correspond to TE0 and TM0 modes, then each of TE0 and TM0 modes can be expressed as a superposition of Pol_In1 and Pol_In2. In these embodiments, the output from input mode TE0 will be a superposition of Pol_Out in each of the two output waveguides with some split ratio and phase relationship between the two outputs. Furthermore, output from input mode TM0 will be orthogonal to the output from input mode TE0.

Passive, lossless optical components without magneto-optic effects are reciprocal; thus, device 100 may also act as a combiner if run in reverse (i.e., the reverse of the operation described above). Sending light into port 110 having polarization Pol_Out sends light having polarization Pol_In1 exiting port 102, while sending light into port 112 having polarization Pol_Out causes light to exit port 102 having the orthogonal polarization Pol_In2. So such a component may convert TE modes from the output into modes at the input which are not fundamental polarization modes of the waveguide (TE0 and TM0) but are superpositions. It may further combine two TE0 modes to be in orthogonal polarizations for transmission down a fiber.

Figure 2A:
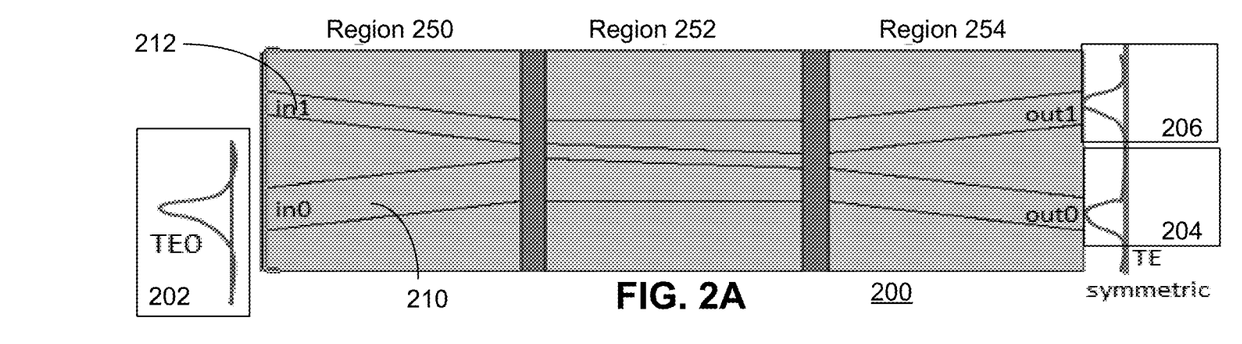
FIG. 2A and FIG. 2B are illustrations of an adiabatic waveguide polarization converter according to an embodiment of the invention.
Figure 2B:
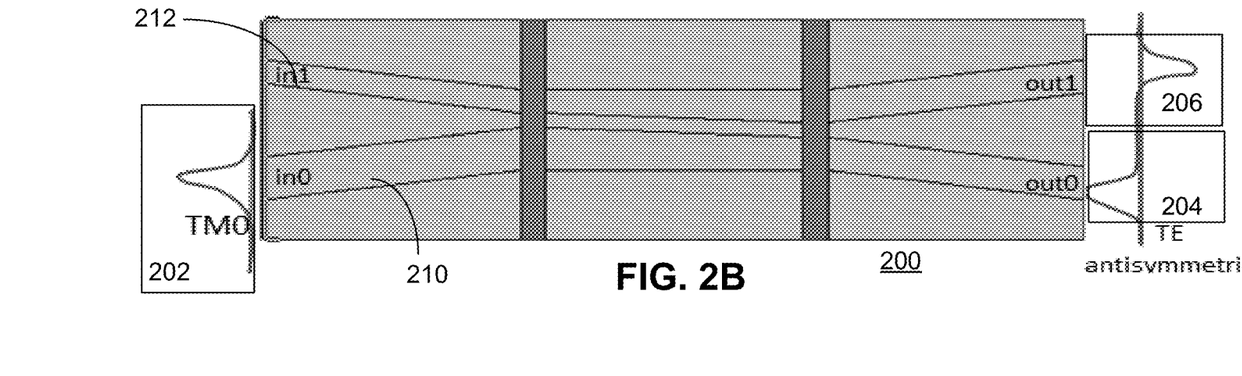

FIG. 2A and FIG. 2B are illustrations of an adiabatic waveguide polarization converter according to an embodiment of the invention. Polarization splitter and converter 200 is shown to include waveguide 210 to receive light from input port 202 and to output light to output port 204. Polarization splitter and converter 200 further includes waveguide 212 to receive light from waveguide 210 and to output light to output port 206. The waveguides are shown to be disposed in an offset manner, and waveguide 212 is shown to include a reverse taper-shaped side to adiabatically receive light from waveguide 210, as described in further detail below. A 'taper' as referred to herein may describe a single taper or a segmented taper (e.g., a taper having some segments to influence mode conversion and other segments with large taper angles to shorten the overall length of taper-shaped side). Waveguides 210 and 212 may comprise the same material, or may each comprise different materials.

In region 250, waveguides 210 and 212 are illustrated to be brought into proximity with each other such that modes can couple between the two waveguides. In region 252, there is an adiabatic width taper. In region 254, the two waveguides are separated.

In this embodiment, polarization splitter and converter 200 is shown in FIG. 2A to convert an input TE0 mode light at input 202 to the TE symmetric mode for outputs 204 and 206, and is shown in FIG. 2B to convert an input TM0 mode light at input 202 to the TE anti-symmetric mode for outputs 204 and 206. Therefore, the output modes corresponding to TE0 and TM0 inputs are orthogonal to one another. If this component were operated in reverse to function as a receiver/combiner (as described above), inputting TE0 mode light in port 204 results in light exiting port 202 with power equally split between TE0 and TM0 modes, in phase; inputting TE0 in port 206 will result in light exiting port 202 with power equally split between TE0 and TM0 modes, out of phase by 180 degrees.

Waveguides 210 and 212 are illustrated as having a difference between waveguide widths that varies along the length of region 252 such that an anti-crossing of two modes in pure polarization states, TE and TM, occurs, as described below. In this embodiment, said waveguides have a vertical (i.e., the direction normal to the wafer surface) asymmetry to cause said anticrossing. Vertical asymmetry may be accomplished, for example, by using a waveguide etch with slanted sidewalls, or by using rib waveguides in which the waveguide material is partially etched but slab material is left behind. It may also be accomplished by using a different top and bottom cladding material.

Waveguides 210 and 212 at region 254 may either comprise equal or unequal widths. In the embodiments where said waveguide widths are unequal, the output modes (e.g., TE symmetric/anti-symmetric mode, as illustrated) are orthogonal to one another, but they may not be strictly symmetric and anti-symmetric as the power splitting in the waveguides is not equal. Such a device may still be described as enabling polarization diversity.

As illustrated, polarization splitter and converter 200 may be created using only a single etch step.

Figure 3:
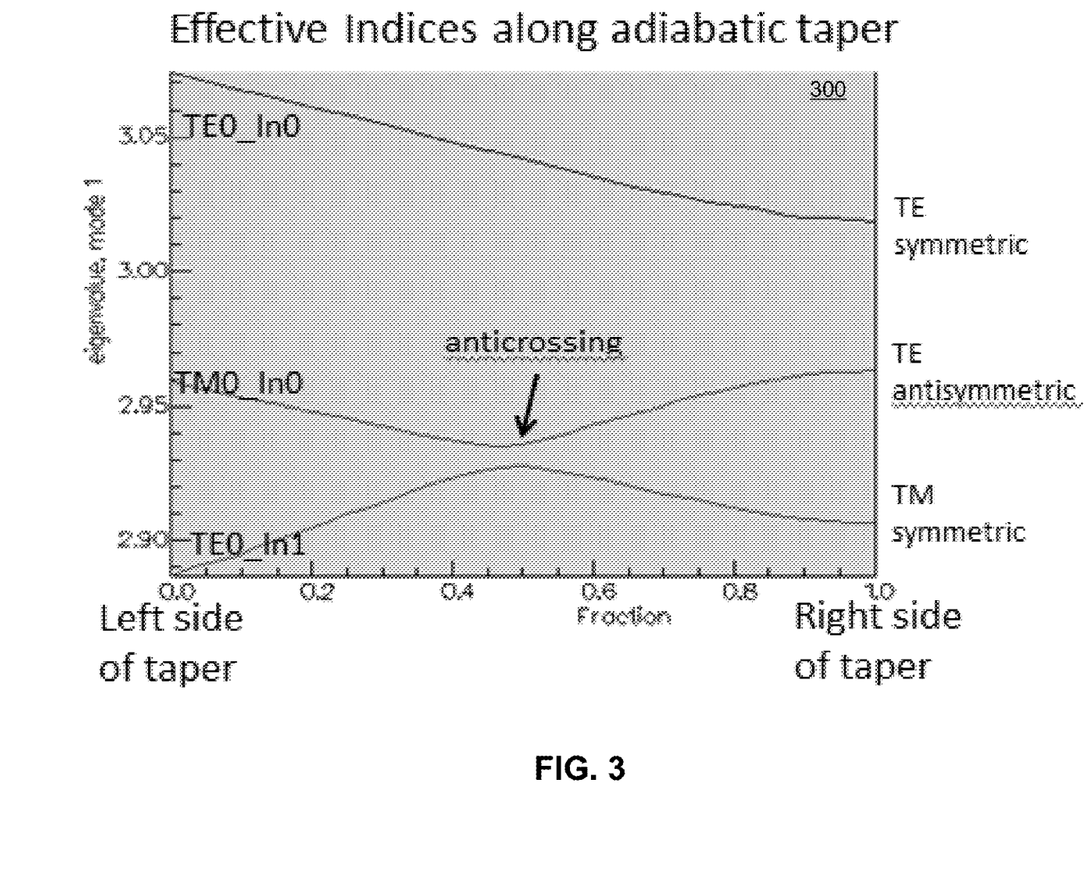
FIG. 3 is an illustration of a mode evolution diagram for an adiabatic waveguide polarization converter according to an embodiment of the invention.

FIG. 3 is an illustration of a mode evolution diagram for an adiabatic waveguide polarization converter according to an embodiment of the invention. Graph 300 illustrates the mode evolution along region 252 of device 200 as described above. An anticrossing is visible where a TM mode and a TE mode interfere, permitting conversion of the input TM0 mode at port 202 to the output TE anti-symmetric mode as described above. Anticrossings occur when two modes of nearly the same index are non-orthogonal, and are close enough spatially to overlap with one another. Such mode hybridization may occur along an adiabatic taper structure.

Figure 4:
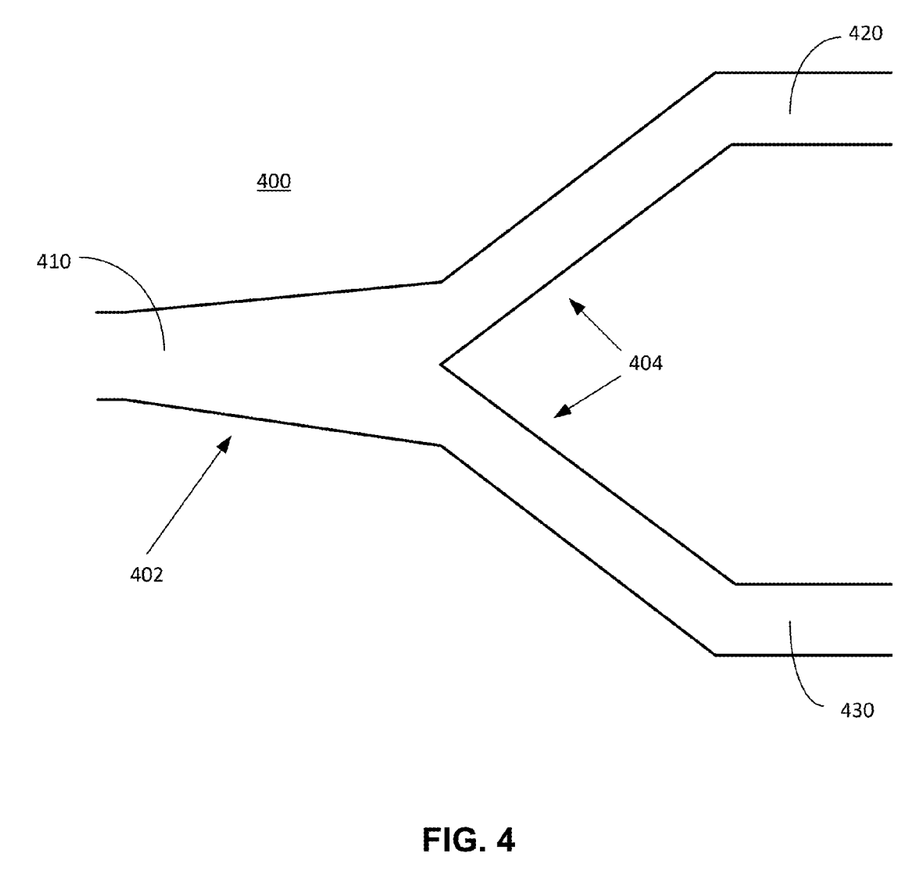
FIG. 4 illustrates an adiabatic waveguide polarization converter according to an embodiment of the invention.

Embodiments of the invention may comprise an adiabatic width taper followed by a (symmetric or asymmetric) Y-junction splitter, and function similar to the previously described embodiments. FIG. 4 illustrates an adiabatic waveguide polarization converter according to an embodiment of the invention. In this embodiment, polarization splitter and converter 400 is shown to comprise a Y-junction including waveguide 410 for receiving light and waveguides 420 and 430 for outputting light. This example embodiment is illustrated to comprise adiabatic width taper 402 followed by splitter 404.

In a typical silicon-on-insulator (SOI) PIC platform in which the TE0 mode has a higher index than the TM0 mode, the function of width taper 402 may be to convert the TM0 mode of the received light to a TE1 mode (i.e., as the waveguide width of taper 402 increases, the difference between the TM0 mode and the TE1 minimizes, as discussed above with reference to FIG. 3), while the TE0 mode of the received light is not converted. Splitter 404 may be designed to convert said TE0 mode into a symmetric superposition of TE0 modes in waveguides 420 and 430, and said TE1 mode into an anti-symmetric superposition of TE0 modes in the two waveguides.

In some embodiments, the input waveguide segment and the first and second output waveguide segments of a polarization splitter and converter may comprise multiple etch heights to efficiently couple different mode orders of the first input mode polarization state of the input waveguide segment (e.g., TE0 and TE1 modes) to symmetric and anti-symmetric modes of the first pure polarization modes for the output waveguide segments (e.g., symmetric and anti-symmetric TE0 modes). Thus, for the example embodiment of FIG. 4, multiple etch heights for the waveguide segments of polarization splitter and converter 400 may create an efficient Y-junction to efficiently split different mode orders for output waveguide segments 420 and 430. Examples of these multiple etch heights are described below.

Figure 5:
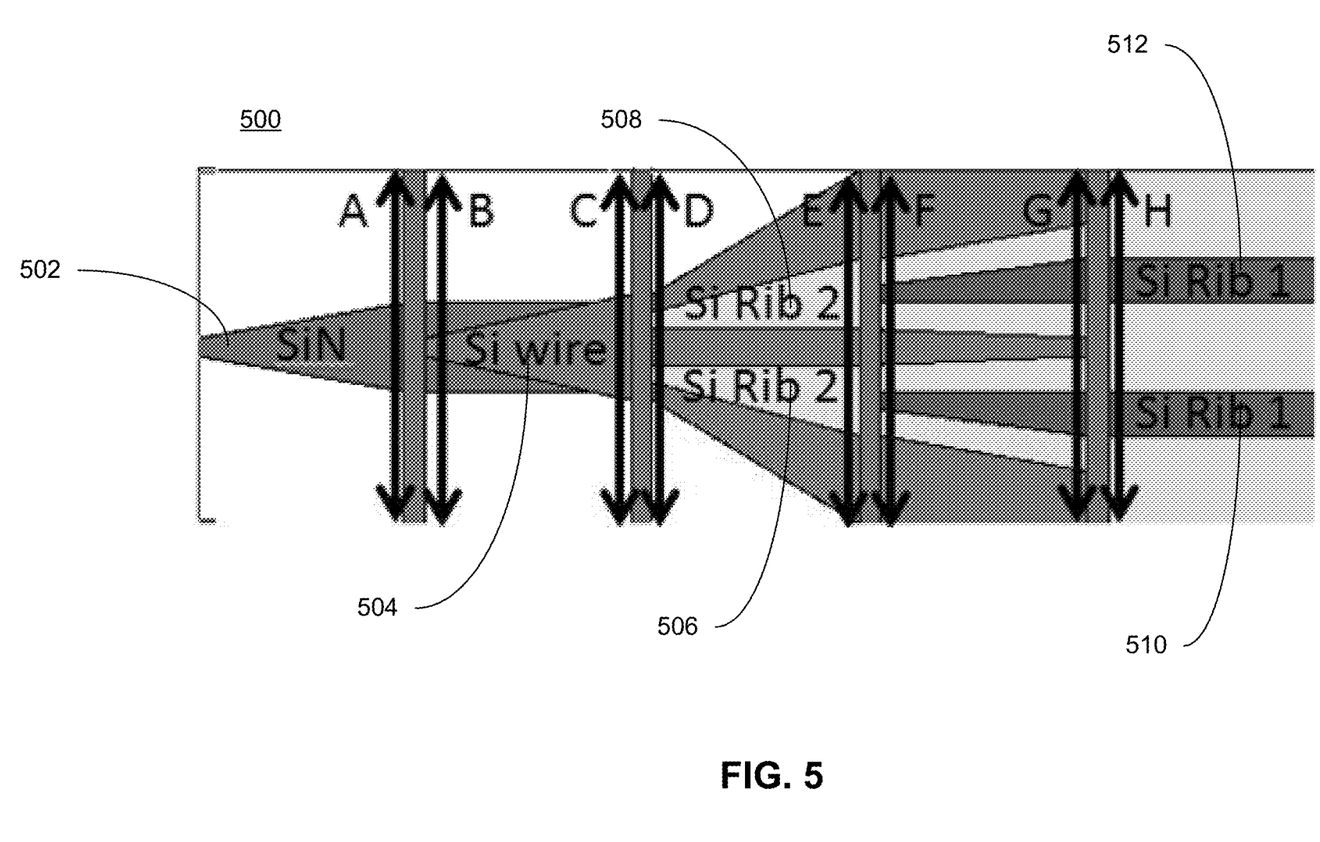
FIG. 5 is an illustration of an adiabatic waveguide polarization converter according to an embodiment of the invention.

FIG. 5 is an illustration of an adiabatic waveguide polarization converter according to an embodiment of the invention. In this embodiment, polarization splitter and converter 500 includes input SiN waveguide 502 and output Si Rib waveguides 510 and 512. In this embodiment, SiN waveguide 502 is illustrated as comprising an inverse taper structure to convert the spot size of the received light from the larger mode of fiber to the smaller mode of the waveguide, thereby integrating spot-size conversion to accomplish fiber coupling and polarization conversion in sequence, without any additional taper segments.

Si wire waveguide 504 is shown to comprise an inverse taper width to transfer energy from SiN waveguide 502; the width of this taper is selected such that, for example, the TE0 mode in the SiN material is transferred to a TE0 mode in Si material, and the TM0 mode in SiN material is transferred to a TE1 mode in Si material. Due to the large vertical asymmetry between overlapping SiN waveguide 502 and Si wire waveguide 504 in this structure, the latter mode transfer occurs efficiently without the need for a very long adiabatic taper and is not sensitive to the wire waveguide width, thereby improving fabrication tolerance.

Polarization splitter and converter 500 further utilizes multiple silicon etch heights to efficiently couple the different mode orders of silicon wire waveguide 504 to the symmetric and anti-symmetric TE modes of rib waveguides 506 and 508. SiN waveguide 502 may be terminated at this region. In effect, multiple etch heights create an efficient Y-junction to efficiently split both of said TE0 and TE1 modes.

Rib waveguides 506 and 508 are shown to taper from a narrow width to a wider width for converting a TE0 mode to a pair of in-phase symmetric TE0 modes in this pair of rib waveguides. The above described TE1 mode may be converted to a pair of out-of-phase/anti-symmetric TE0 modes in this pair of rib waveguides. Rib waveguides 510 and 512 are optional rib waveguides to shift the TE0 modes of rib waveguides 506 and 508 into taller waveguides. In other embodiments, rib waveguides 510 and 512 are not utilized, and light is output via waveguides 506 and 508.

Figure 6A:
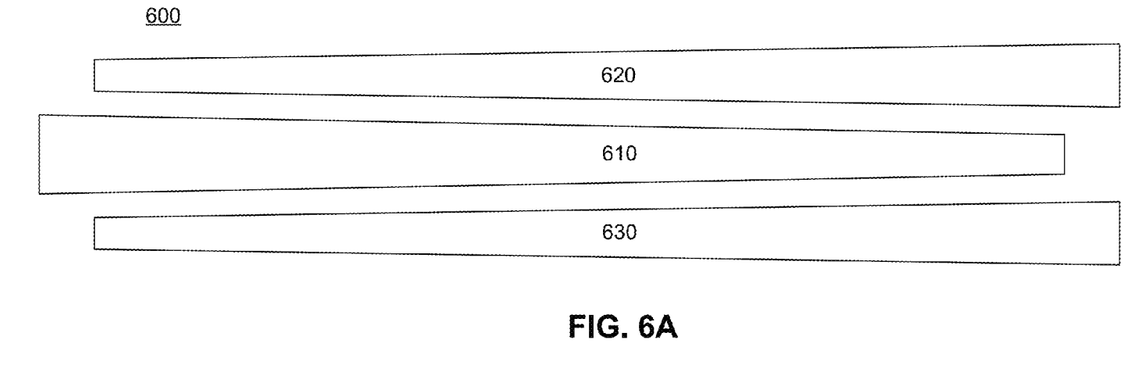
FIG. 6A and FIG. 6B are illustrations of an adiabatic waveguide polarization converter according to an embodiment of the invention.
Figure 6B:
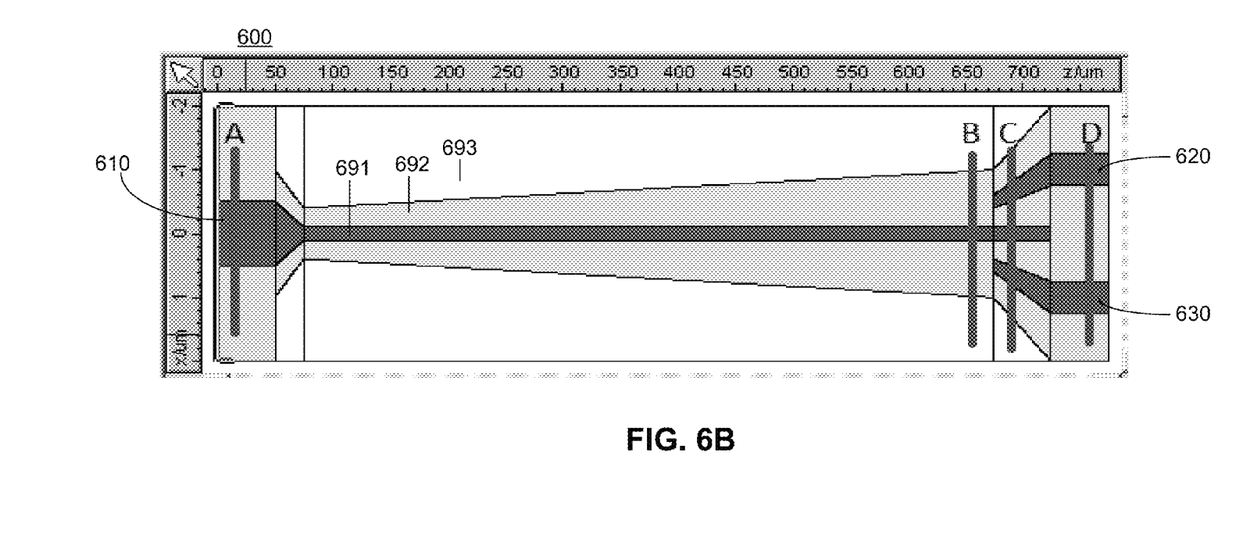

FIG. 6A and FIG. 6B are illustrations of an adiabatic waveguide polarization converter according to an embodiment of the invention. In this embodiment, polarization splitter and converter 600 is shown in FIG. 6A to include three waveguides—input waveguides 610 and output waveguides 620 and 630. Input waveguide 610 is illustrated as tapering from a wide width to a narrow width, while output waveguides 620 and 630 are illustrated as tapering from narrow widths to wide widths. Said tapers of the input and output waveguides may comprise single tapers or segmented tapers (i.e., segmented to optimize the apparatus with respect to efficiency of mode conversion, compactness, wavelength bandwidth of operation, and fabrication tolerance).

Said output waveguides are shown to be in close proximity to input waveguide 610 for evanescent coupling. Similar to the other embodiments for polarization splitter and converters described above, input waveguide 610 may accept light comprising othogonal polarization modes (e.g., fundamental TE0 and TM0 modes), and output waveguides 620 and 630 may each emit the same pure polarization state (e.g., fundamental TE0 modes).

In this embodiment, vertical asymmetry is used to accomplish conversion of the input TM0 mode to the output TE modes by causing these modes to be non-orthogonal, allowing hybridization—e.g., by having a different top and bottom cladding material or by using rib waveguides. FIG. 6B illustrates how multiple etch heights may be used to accomplish said vertical asymmetry in a geometry that leads to strong interaction between the modes, allowing for polarization splitting and conversion in a small footprint. Additionally an embodiment of this design had an optical bandwidth that spanned both the O band and the C band. At section A of FIG. 6B, input waveguide 610 is shown to taper from a wide to a narrow width. Output waveguides 620 and 630 are shown to taper from a narrow to a wide width from sections C to D. In this embodiment, multiple etch heights are used; etch height 691 comprises thicker Si (in an SOI oxide-clad waveguide), etch height 692 comprises thinner Si, and etch height 693 comprises Si fully etched to a bured oxide (BOX) layer (i.e., the Si material is replaced with oxide cladding).

At section B of FIG. 6B, as compared to the input at section A, the section of input waveguide 610 at etch height 691 has been tapered to a small width, and the waveguide section at etch height 692 has been tapered to a wide width. At this cross section, power from the TM0 mode light at waveguide 610 is transformed into a TE1 mode confined primarily within the thinner waveguide's boundaries.

At adjacent section C of FIG. 6B, two inverse taper tips of waveguides 620 and 630 are introduced that transform light from the TE1 mode at section B to be confined primarily in the thicker waveguides at etch height 691 at section D. These inverse tapers may also confine the TE0 mode from section B into output waveguides 620 and 630 at etch height 691 at D. The center waveguide may or may not be present at sections C and D.

In this embodiment, the design of the transition from section B to section C involving the two taper tips of waveguides 620 and 630 may introduce only a small discontinuity in the modes, so this may be described as a low-loss transition. This embodiment is shown to have a plane of symmetry. Other embodiments, either by design or by unintentional offset of the two etch masks, may be asymmetric.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

The above described embodiments of the invention may comprise SOI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

Embodiments of the invention thus describe an apparatus including an input port to receive light from a fiber, a first and a second output port, and a polarization converter and splitter coupling the input port and the first and second output ports. This polarization converter and splitter may be configured such that light having a first input mode polarization state is output via the first output port as a first output light having a first pure polarization state, and light having a second input mode polarization state, orthogonal to the first input mode polarization state, is output via the second output port as a second output light having the first pure polarization state and orthogonal in amplitude or phase to the first output light.

In embodiments of the invention, said polarization converter and splitter comprises an input waveguide segment to receive light from the input port, a first output waveguide segment to receive light from the input waveguide segment and to output light to the first output port, a second output waveguide segment to receive light from the input waveguide segment and to output light to the second output port, and a taper section having a changing width increasing along a length to adiabatically convert the light to be output from the second input mode polarization state to the first pure polarization state. The waveguides of the polarization converter and splitter may be disposed for an anti-crossing to occur within the taper section between a mode in the first pure polarization state and a mode in an orthogonal second pure polarization state.

In embodiments of the invention, the first and second output ports of an apparatus may comprise equal or unequal widths. For embodiments having the first and second output ports comprising equal widths, light entering the input port in the first pure polarization state exits the first and second output ports as a symmetric mode encompassing both ports in the first pure polarization state, and light entering the input in the orthogonal second pure polarization state exits the first and second output ports as an antisymmetric mode encompassing both ports in the first pure polarization state.

In some embodiments, the input waveguide segment and the first and second output waveguide segments of the polarization converter and splitter comprise the same material.

The first input mode polarization state as described above may comprise a transverse electric (TE) mode and the second input mode polarization state may comprise a transverse magnetic (TM) mode. In other embodiments, the first input mode polarization state and the second input mode polarization states both comprise a non-transverse electric (TE) mode and a non-transverse magnetic (TM) mode. In some embodiments, the first pure polarization state comprises one of a transverse electric (TE) mode or a transverse magnetic (TM) mode.

In some embodiments, the above described input waveguide segment and the first output waveguide segment are included in a first waveguide, the second output waveguide segment is included in a second waveguide, and the taper section of the polarization splitter and converter includes the second waveguide having a taper section having a changing width increasing along a length to adiabatically receive light from the first waveguide, and the second waveguide is disposed adjacent to the first waveguide such that the waveguides are asymmetrical for the anti-crossing of a mode in the first pure polarization state and a mode in an orthogonal second pure polarization state to occur, causing adiabatic exchange and conversion of the light from the orthogonal second pure polarization state to the first pure polarization state.

In some embodiments, this input waveguide segment, and first output waveguide segment, and the second output waveguide segment are each included in separate waveguides, wherein the input waveguide segment is disposed between the first and second output waveguide segments, and wherein each of the first and second output waveguide segments includes a taper having a changing width increasing along a length to receive two modes in the first pure polarization state encompassing both the first and second output waveguides, and wherein an anti-crossing of a mode in the first pure polarization state and a mode in an orthogonal second pure polarization state occurs along a region of the device in which one or both of the input waveguide segment and the output waveguide segments is tapered to adiabatically exchange and convert the light from the orthogonal second pure polarization state to the first pure polarization state. The tapers of the input waveguide segment and the first and second output waveguide segments may comprise a single taper or a segmented taper. In some embodiments, said input waveguide segment comprises a SiN waveguide, and the first and second output waveguide segments comprise Si rib waveguides, and the polarization converter and splitter further comprises an Si wire waveguide coupling the SiN waveguide to the Si rib waveguides. Each of the first and second output waveguide segments may comprise multiple etch heights to efficiently couple the TE0 and TE1 modes of the Si wire waveguide to the symmetric and anti-symmetric TE modes of the Si rib waveguides.

In some embodiments, the above described apparatus is operational in reverse to function as a combiner to combine light having the first pure polarization state in the first output port and the first pure polarization state in the second output port into light having the first and the second input mode polarization states.

In some embodiments, the input waveguide segment includes the taper section wherein an anti-crossing of a mode in the first pure polarization state and a mode in an orthogonal second pure polarization state occurs, and the first output waveguide segment and the second output waveguide segment form a Y-junction.

In some embodiments, each of the input waveguide segment and the first and second output waveguide segments comprise multiple etch heights to efficiently couple different mode orders of the first input mode polarization state of the input waveguide segment to symmetric and anti-symmetric modes of the first pure polarization modes for the output waveguide segments.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An apparatus comprising:
an input port to receive light from a fiber;
a first and a second output port; and
a polarization converter and splitter coupling the input port and the first and second output ports configured such that:
light having a first input mode polarization state is output via the first output port as a first output light having a first pure polarization state; and
light having a second input mode polarization state, orthogonal to the first input mode polarization state, is output via the second output port as a second output light having the first pure polarization state and orthogonal in amplitude or phase to the first output light;
wherein the polarization converter and splitter comprises:
an input waveguide segment to receive light from the input port;
a first output waveguide segment to receive light from the input waveguide segment and to output light to the first output port;
a second output waveguide segment to receive light from the input waveguide segment and to output light to the second output port; and
a taper section having a changing width increasing along a length to adiabatically convert the light to be output from the second input mode polarization state to the first pure polarization state; and
wherein the waveguides of the polarization converter and splitter are disposed for an anti-crossing to occur within the taper section between a mode in the first pure polarization state and a mode in an orthogonal second pure polarization state.

2. The apparatus of claim 1, wherein the first and second output ports comprise unequal widths.

3. The apparatus of claim 1, wherein the first and second output ports comprise equal widths.

4. The apparatus of claim 3, wherein light entering the input port in the first pure polarization state exits the first and second output ports as a symmetric mode encompassing both ports in the first pure polarization state; and
light entering the input in the orthogonal second pure polarization state exits the first and second output ports as an antisymmetric mode encompassing both ports in the first pure polarization state.

5. The apparatus of claim 1, wherein the input waveguide segment and the first and second output waveguide segments of the polarization converter and splitter comprise the same material.

6. The apparatus of claim 1, wherein the first input mode polarization state and the second input mode polarization states both comprise a non-transverse electric (TE) mode and a non-transverse magnetic (TM) mode.

7. The apparatus of claim 1, wherein the first pure polarization state comprises one of a transverse electric (TE) mode or a transverse magnetic (TM) mode.

8. The apparatus of claim 1, wherein the input waveguide segment and the first output waveguide segment are included in a first waveguide, the second output waveguide segment is included in a second waveguide, and the taper section of the polarization splitter and converter includes the second waveguide having a taper section having a changing width increasing along a length to adiabatically receive light from the first waveguide, and the second waveguide is disposed adjacent to the first waveguide such that the waveguides are asymmetrical for the anti-crossing of a mode in the first pure polarization state and a mode in an orthogonal second pure polarization state to occur, causing adiabatic exchange and conversion of the light from the orthogonal second pure polarization state to the first pure polarization state.

9. The apparatus of claim 1, wherein the input waveguide segment, and first output waveguide segment, and the second output waveguide segment are each included in separate waveguides, wherein the input waveguide segment is disposed between the first and second output waveguide segments, and wherein each of the first and second output waveguide segments includes a taper having a changing width increasing along a length to receive two modes in the first pure polarization state encompassing both the first and second output waveguides, and wherein an anti-crossing of a mode in the first pure polarization state and a mode in an orthogonal second pure polarization state occurs along a region of the device in which one or both of the input waveguide segment and the output waveguide segments is tapered to adiabatically exchange and convert the light from the orthogonal second pure polarization state to the first pure polarization state.

10. The apparatus of claim 9, wherein the tapers of the input waveguide segment and the first and second output waveguide segments comprise a single taper.

11. The apparatus of claim 9, wherein the tapers of the input waveguide segment and the first and second output waveguide segments comprise a segmented taper.

12. The apparatus of claim 9, wherein the input waveguide segment comprises a SiN waveguide, and the first and second output waveguide segments comprise Si rib waveguides, and the polarization converter and splitter further comprises:
an Si wire waveguide coupling the SiN waveguide to the Si rib waveguides.

13. The apparatus of claim 12, wherein each of the first and second output waveguide segments comprise multiple etch heights to efficiently couple the TE0 and TE1 modes of the Si wire waveguide to the symmetric and anti-symmetric TE modes of the Si rib waveguides.

14. The apparatus of claim 1, wherein the apparatus is operational in reverse to function as a combiner to combine light having the first pure polarization state in the first output port and the first pure polarization state in the second output port into light having the first and the second input mode polarization states.

15. The apparatus of claim 1, wherein the input waveguide segment includes the taper section wherein an anti-crossing of a mode in the first pure polarization state and a mode in an orthogonal second pure polarization state occurs, and the first output waveguide segment and the second output waveguide segment form a Y-junction.

16. The apparatus of claim 1, wherein each of the input waveguide segment and the first and second output waveguide segments comprise multiple etch heights to efficiently couple different mode orders of the first input mode polarization state of the input waveguide segment to symmetric and anti-symmetric modes of the first pure polarization modes for the output waveguide segments.

* * * * *